United States Patent
Kyono (10) Patent No.: US 8,724,345 B2
(45) Date of Patent: May 13, 2014

(54) SELF POWER SOURCE APPARATUS

(75) Inventor: Yoichi Kyono, Niiza (JP)

(73) Assignee: Sanken Electric Co., Ltd., Niiza-shi (JP)

( * ) Notice: Subject to any disclaimer, the term of this patent is extended or adjusted under 35 U.S.C. 154(b) by 149 days.

(21) Appl. No.: 13/494,342

(22) Filed: Jun. 12, 2012

(65) Prior Publication Data

US 2012/0320637 A1    Dec. 20, 2012

(30) Foreign Application Priority Data

Jun. 15, 2011  (JP) ................. 2011-132906

(51) Int. Cl.
*H02M 3/335*  (2006.01)

(52) U.S. Cl.
USPC .............. 363/16; 363/17; 363/18; 363/21.02; 363/22; 363/23

(58) Field of Classification Search
USPC .......................... 363/16, 17, 18, 21, 2, 22, 23
See application file for complete search history.

(56) References Cited

U.S. PATENT DOCUMENTS

| | | | | |
|---|---|---|---|---|
| 5,786,990 A * | 7/1998 | Marrero | ............................ | 363/16 |
| 6,009,001 A * | 12/1999 | Otake | ............................. | 363/23 |
| 6,266,254 B1 * | 7/2001 | Ohtake | ............................ | 363/22 |
| 6,400,584 B1 * | 6/2002 | Sabate et al. | .................... | 363/22 |
| 6,917,528 B2 * | 7/2005 | Abe | ................................ | 363/22 |
| 7,193,866 B1 * | 3/2007 | Huang | ............................. | 363/22 |
| 7,315,460 B2 | 1/2008 | Kyono | | |
| 7,339,799 B2 | 3/2008 | Osaka et al. | | |
| 7,375,987 B2 | 5/2008 | Kyono | | |
| 7,629,781 B2 | 12/2009 | Kyono | | |
| 7,706,156 B2 * | 4/2010 | Hsieh et al. | ................. | 363/21.02 |
| 7,760,521 B2 * | 7/2010 | Huang | ............................ | 363/22 |
| 7,787,265 B2 * | 8/2010 | Lim et al. | ........................ | 363/22 |
| 7,944,085 B2 | 5/2011 | Kyono | | |
| 8,063,507 B2 | 11/2011 | Kyono | | |
| 8,189,355 B2 | 5/2012 | Kyono | | |
| 2010/0046251 A1 | 2/2010 | Kyono | | |
| 2010/0172159 A1 | 7/2010 | Kyono | | |
| 2011/0051468 A1 | 3/2011 | Kyono | | |

FOREIGN PATENT DOCUMENTS

| | | |
|---|---|---|
| JP | 4-105552 | 4/1992 |
| JP | 2010-110114 | 5/2010 |

* cited by examiner

*Primary Examiner* — Bao Q Vu
(74) *Attorney, Agent, or Firm* — Oblon, Spivak, McClelland, Maier & Neustadt, L.L.P.

(57) ABSTRACT

A switching power source apparatus has a pulse generator of a first pulse. A first resonant series circuit receives the first pulse signal and passes a current having a 90-degree phase delay with respect to the first pulse signal. The current of the first resonant series circuit turns on/off a switching element Q21. A second resonant series circuit receives the second pulse signal and passes a current having a 90-degree phase delay with respect to the second pulse signal. The current of the second resonant series circuit turns on/off a switching element Q22. The pulse generator has a third transformer T3 that has secondary windings to output the first and second pulse signals according to a voltage that is applied to the third transformer and is synchronized with drive signals for the switching elements Q11 and Q12.

3 Claims, 4 Drawing Sheets

SELF POWER SOURCE APPARATUS

BACKGROUND OF THE INVENTION

1. Field of the Invention

The present invention relates to a switching power source apparatus that is simple and low cost.

2. Description of Related Art

Figure 1:
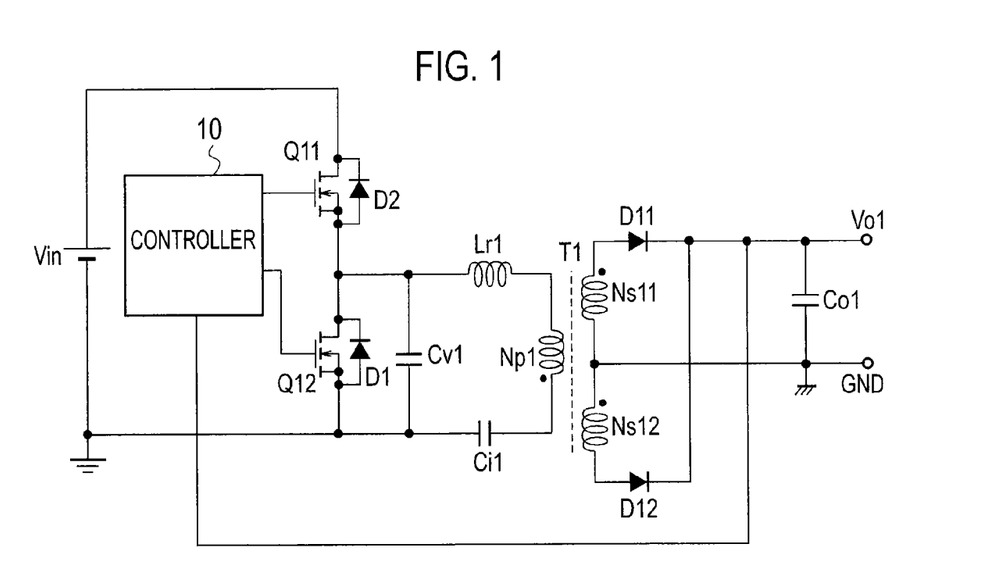
FIG. 1 is a circuit diagram illustrating a switching power source apparatus according to a related art.

FIG. 1 is a circuit diagram illustrating a switching power source apparatus according to a related art. This switching power source apparatus is a current resonant switching power source apparatus that receives a DC input voltage Vin generated by, for example, rectifying and smoothing a commercial AC voltage and supplied from a DC power source Vin. Both ends of the DC power source Vin are connected to a series circuit that includes first and second switching elements Q11 and Q12 are MOSFETs.

Connected between the drain and source of the switching element Q12 (or Q11) are a voltage resonant capacitor Cv1 and a first resonant circuit that includes a resonant reactor Lr1, a primary winding Np1 of a transformer T1, and a current resonant capacitor Ci1. The resonant reactor Lr1 may be a leakage inductance of the transformer T1.

A diode D1 is connected between the drain and source of the switching element Q12 and a diode D2 is connected between the drain and source of the switching element Q11. The diodes D1 and D2 may be parasitic diodes of the switching elements Q12 and Q11, respectively.

On the secondary side of the transformer T1, secondary windings Ns11 and Ns12 are wound in opposite phase and are connected in series. Voltages generated by the secondary windings Ns11 and Ns12 are rectified by diodes D11 and D12 and are smoothed by an output smoothing capacitor Co1 into an output voltage Vo1.

A controller 10 alternately provides the gates of the switching elements Q11 and Q12 with gate signals that have the same ON width and contain a dead time to prevent the switching elements Q11 and Q12 from simultaneously turning on.

Figure 2:
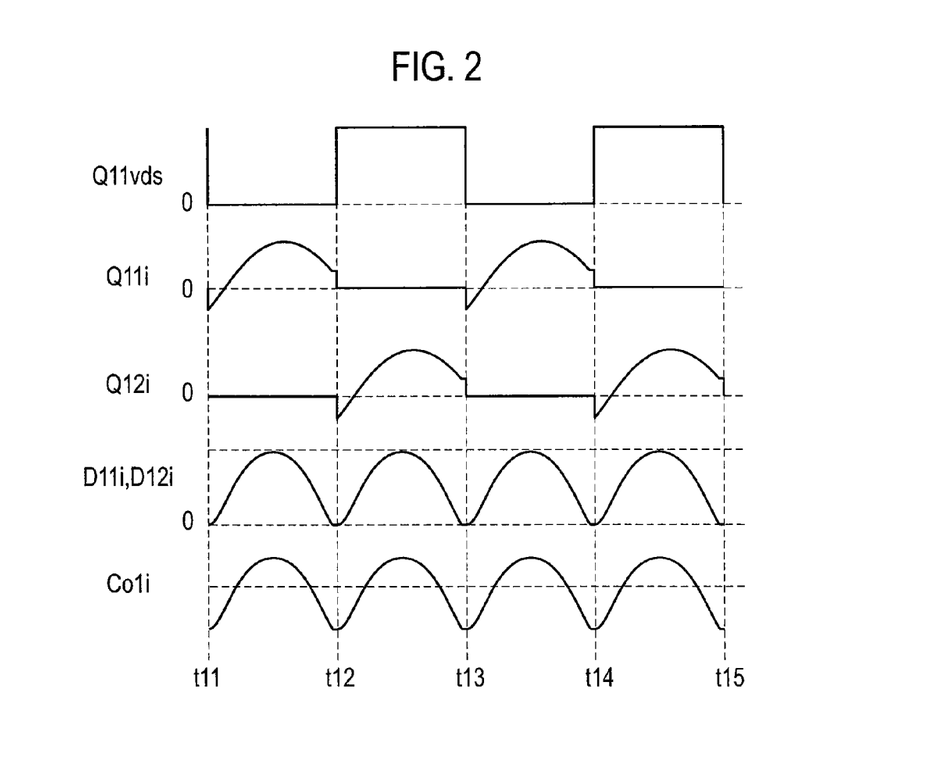
FIG. 2 is a waveform diagram illustrating operation of the switching power source apparatus of FIG. 1.

In response to the gate signals, the switching elements Q11 and Q12 alternately turn on/off, to pass resonant currents Q11*i* and Q12*i* as illustrated in FIG. 2. This results in passing sinusoidal resonant currents D11*i* and D12*i* through the diodes D11 and D12 on the secondary side of the transformer T1.

The output voltage Vo1 is fed back through an insulating device such as a photocoupler (not illustrated) to the controller 10 on the primary side. According to the fed-back signal, the controller 10 controls the switching frequency of the switching elements Q11 and Q12 in such a way as to maintain the output voltage Vo1 at a predetermined value.

According to this related art, a current passes in a negative direction (a forward voltage of the diode D2 (D1)) through the diode D2 (D1) when the switching element Q11 (Q12) is ON as illustrated in FIG. 2, to cause no switching loss. Due to resonance, no surge voltage occurs in an OFF state of the switching element Q11 (Q12). Accordingly, the switching elements Q11 and Q12 may have a low withstand voltage to improve the efficiency of the apparatus.

The current resonant switching power source apparatus of FIG. 1, however, alternately causes the sinusoidal currents D11*i* and D12*i* on the secondary side, and therefore, the currents D11*i* and D12*i* demonstrate discontinuity. As a result, a ripple current Co1*i* of the output smoothing capacitor Co1 becomes about 50% to 70% of an output current, which is larger than that of a forward converter that continuously causes a current. An electrolytic capacitor usually used for the output smoothing capacitor Co1 must follow a ripple current standard. For this, the output smoothing capacitor Co1 is usually a plurality of electrolytic capacitors connected in parallel. This capacitor configuration results in increasing the cost and size of the switching power source apparatus.

To solve this problem, Japanese Unexamined Patent Application Publication No. H04-105552 (Patent Document 1) discloses a switching power source apparatus that connects a plurality of circuits in parallel and operates the circuits by shifting the phases of the circuits from one to another, thereby reducing a ripple current of electrolytic capacitors.

The related art of Patent Document 1, however, must have a circuit for dividing the frequency of a pulse signal from a high-frequency oscillator arranged in a controller, to complicate the controller and increase the cost of the apparatus.

Another related art is disclosed in Japanese Unexamined Patent Application Publication No. 2010-110114 (Patent Document 2). This is a switching power source apparatus including a first converter that has a first transformer and a series circuit of first and second switching elements, a second converter that has a second transformer and a series circuit of third and fourth switching elements, a series circuit that is connected to both ends of the second switching element and includes a primary winding of a third transformer and a third capacitor, the third transformer having first and second secondary windings wound in opposite polarity, a first resonant series circuit that is connected in series with the first secondary winding of the third transformer and includes a first resonant reactor and a first resonant capacitor, a first controller that turns on/off the third switching element according to a current of the first resonant series circuit, a second resonant series circuit that is connected in series with the second secondary winding of the third transformer and includes a second resonant reactor and a second resonant capacitor, and a second controller that turns on/off the fourth switching element according to a current of the second resonant series circuit. The first resonant series circuit causes a current having a 90-degree phase delay with respect to a voltage generated by the first secondary winding of the third transformer, and according to the current of the first resonant series circuit, the third switching element is turned on/off. The second resonant series circuit causes a current having a 90-degree phase delay with respect to a voltage generated by the second secondary winding of the third transformer, and according to the current of the second resonant series circuit, the fourth switching element is turned on/off (FIG. 9 of Patent Document 2). As a result, the second converter operates with a 90-degree phase difference with respect to the first converter. Only by adding a simple circuit, this related art realizes a phase-shifted parallel operation and reduces a ripple current of an output smoothing capacitor.

SUMMARY OF THE INVENTION

The related art of Patent Document 2, however, applies a high voltage to the primary winding of the third transformer if an input DC voltage from a DC power source Vin is about, for example, 400 V. The third transformer, therefore, must be designed in consideration of saturation. To avoid saturation, the primary winding of the third transformer must have an increased number of turns. This results in increasing the numbers of turns of the secondary windings, thereby increasing the size and cost of the third transformer.

If turn ratios among the primary, first secondary, and second secondary windings of the third transformer are determined so that the third and fourth switching elements may operate even when the input DC voltage is high, the first and second secondary windings generate rather low voltages when the input DC voltage decreases. In this case, the third and fourth switching elements will not operate.

The present invention provides a switching power source apparatus capable of employing a low-voltage transformer that is small and low cost and driving switching elements without regard to the magnitude of an input DC voltage.

According to an aspect of the present invention, the switching power source apparatus includes a first converter having a series circuit that is connected to both ends of a DC power source and includes a first switching element and a second switching element, a series circuit that is connected to both ends of one of the first and second switching elements and includes a primary winding of a first transformer and a first capacitor, and a first rectifier that rectifies a voltage generated by a secondary winding of the first transformer; a second converter having a series circuit that is connected to the both ends of the DC power source and includes a third switching element and a fourth switching element, a series circuit that is connected to both ends of one of the third and fourth switching elements and includes a primary winding of a second transformer and a second capacitor, and a second rectifier that rectifies a voltage generated by a secondary winding of the second transformer; a smoother that smoothes currents outputted from the first and second rectifiers; a pulse generator that outputs a first pulse signal according to a switching state of the first switching element and a second pulse signal according to a switching state of the second switching element; a first resonant series circuit that receives the first pulse signal and includes a first resonant reactor and a first resonant capacitor; a first controller that turns on/off the third switching element according to a current of the first resonant series circuit; a second resonant series circuit that receives the second pulse signal and includes a second resonant reactor and a second resonant capacitor; and a second controller that turns on/off the fourth switching element according to a current of the second resonant series circuit. The current of the first resonant series circuit to turn on/off the third switching element involves a 90-degree phase delay with respect to the first pulse signal and the current of the second resonant series circuit to turn on/off the fourth switching element involves a 90-degree phase delay with respect to the second pulse signal, so that the second converter operates with a 90-degree phase difference with respect to operation of the first converter. The pulse generator includes a third transformer having first and second secondary windings to output the first and second pulse signals, respectively, according to a voltage that is applied to the third transformer and is synchronized with drive signals for the first and second switching elements.

DESCRIPTION OF THE PREFERRED EMBODIMENTS

Switching power source apparatuses according to embodiments of the present invention will be explained in detail with reference to the drawings.

Embodiment 1

Figure 3:
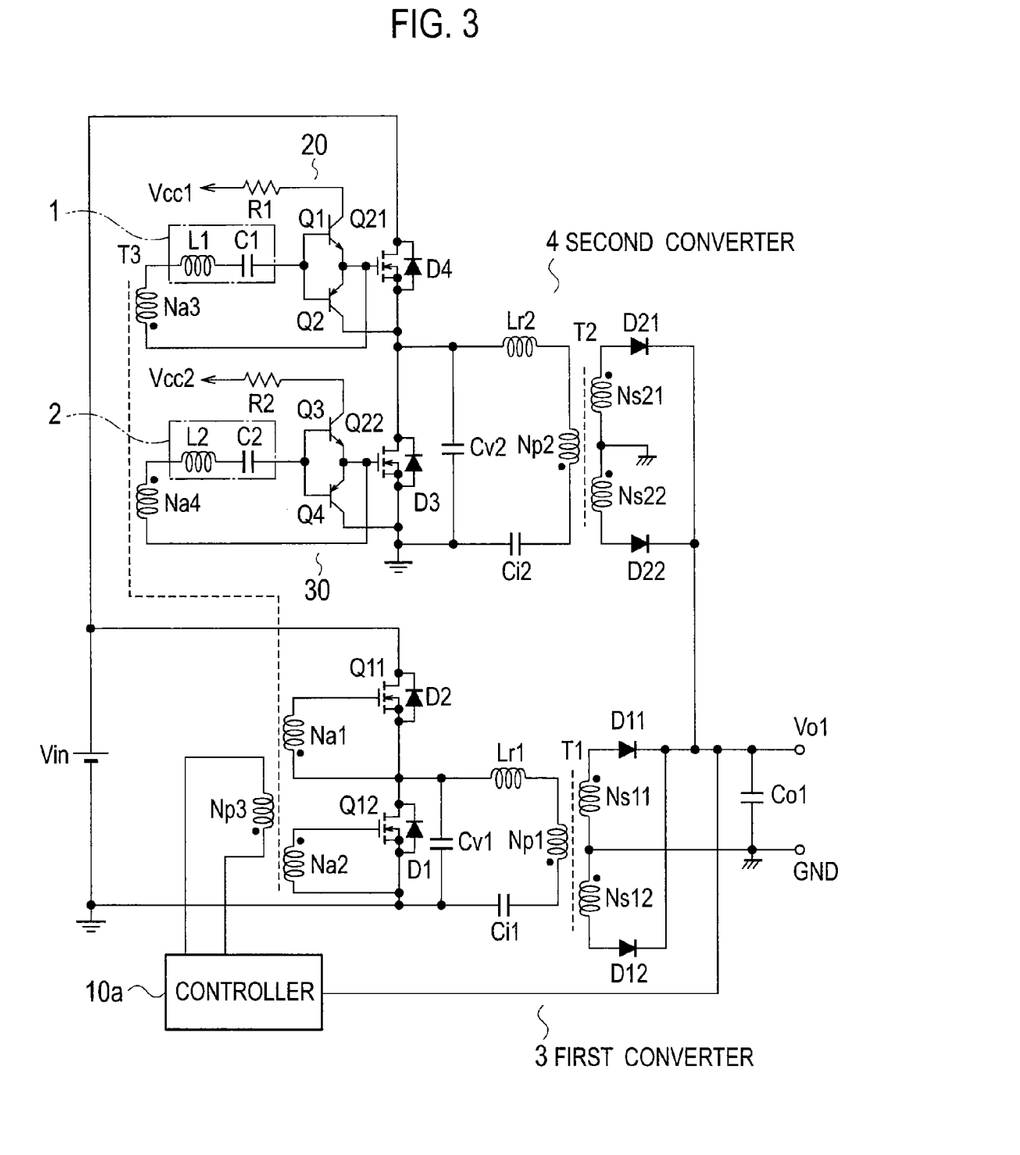
FIG. 3 is a circuit diagram illustrating a switching power source apparatus according to Embodiment 1 of the present invention.

FIG. 3 is a circuit diagram illustrating a switching power source apparatus according to Embodiment 1 of the present invention. This switching power source apparatus includes a DC power source Vin, a first converter 3, a second converter 4, and an output smoothing capacitor Co1.

The first converter 3 is similar to the switching power source apparatus of the related art illustrated in FIG. 1 except for a pulse transformer T3 and a controller 10a, and therefore, overlapping explanations will be omitted.

The pulse transformer T3 (corresponding to the "third transformer" stipulated in the claims) has a primary winding Np3, a secondary winding Na1 (corresponding to the "third secondary winding" stipulated in the claims), a secondary winding Na2 (corresponding to the "fourth secondary winding" stipulated in the claims), a secondary winding Na3 (corresponding to the "first secondary winding" stipulated in the claims), and a secondary winding Na4 (corresponding to the "second secondary winding" stipulated in the claims).

Both ends of the primary winding Np3 are connected to output terminals of the controller 10a. A first end of the secondary winding Na1 is connected to a gate of a switching element Q11 and a second end of the secondary winding Na1 is connected to a connection point between the switching element Q11 and a switching element Q12. A first end of the secondary winding Na2 is connected to a gate of the switching element Q12 and a second end of the secondary winding Na2 is connected to a negative electrode of the DC power source Vin.

The controller 10a applies a rectangular AC voltage (drive signals for the switching elements Q11 and Q12) to the primary winding Np3 of the pulse transformer T3.

The second converter 4 includes a series circuit that is connected to the both ends of the DC power source Vin and includes a switching element Q21 (corresponding to the "third switching element" stipulated in the claims) is a MOSFET and a switching element Q22 (corresponding to the "fourth switching element" stipulated in the claims) is a MOSFET.

The switching elements Q11 and Q12 form a first switch circuit and the switching elements Q21 and Q22 form a second switch circuit.

Connected between the drain and source of the switching element Q22 (or Q21) are a voltage resonant capacitor Cv2 and a second resonant circuit that includes a resonant reactor Lr2, a primary winding Np2 of a transformer T2 (corresponding to the "second transformer" stipulated in the claims), and a current resonant capacitor Ci2. The resonant reactor Lr2 may be a leakage inductance of the transformer T2.

A diode D3 is connected between the drain and source of the switching element Q22 and a diode D4 is connected between the drain and source of the switching element Q21. The diodes D3 and D4 may be parasitic diodes of the switching elements Q21 and Q22, respectively.

On the secondary side of the transformer T2, secondary windings Ns21 and Ns22 are wound in opposite phase and are connected in series. Voltages generated by the secondary windings Ns21 and Ns22 are rectified through diodes D21 and D22 and are smoothed with the output smoothing capacitor Co1 into an output voltage Vo1.

The diodes D11, D12, D21, and D22 and output smoothing capacitor Co1 form a rectifying-smoothing circuit.

The gate of the switching element Q21 is connected to a gate driver 20 and the gate of the switching element Q22 is connected to a gate driver 30.

The gate driver 20 (corresponding to the "first controller" stipulated in the claims) is connected to a first end of a resonant series circuit 1 (corresponding to the "first resonant series circuit" stipulated in the claims). The resonant series circuit 1 includes a resonant reactor L1 and a resonant capacitor C1, the resonant reactor L1 being connected to a first end of the secondary winding Na3 of the pulse transformer T3. The first end of the resonant series circuit 1 is connected to bases of totem-pole-connected transistors Q1 and Q2. A collector of the transistor Q1 is connected to a driving power source Vcc1 and a collector of the transistor Q2 is connected to the source of the switching element Q21. Emitters of the transistors Q1 and Q2 are connected to the gate of the switching element Q21 and a second end of the secondary winding Na3 of the pulse transformer T3.

The gate driver 30 (corresponding to the "second controller" stipulated in the claims) is connected to a first end of a resonant series circuit 2 (corresponding to the "second resonant series circuit" stipulated in the claims). The resonant series circuit 2 includes a resonant reactor L2 and a resonant capacitor C2, the resonant reactor L2 being connected to a first end of the secondary winding Na4 of the pulse transformer T3. The first end of the resonant series circuit 2 is connected to bases of totem-pole-connected transistors Q3 and Q4. A collector of the transistor Q3 is connected to a driving power source Vcc2 and a collector of the transistor Q4 is connected to the source of the switching element Q22. Emitters of the transistors Q3 and Q4 are connected to the gate of the switching element Q22 and a second end of the secondary winding Na4 of the pulse transformer T3.

The secondary windings Na3 and Na4 of the pulse transformer T3 are in opposite polarity and the secondary windings Na1 and Na2 thereof are in opposite polarity. In this example, the secondary windings Na1 and Na3 are in the same polarity and the secondary windings Na2 and Na4 are in the same polarity.

Figure 4:
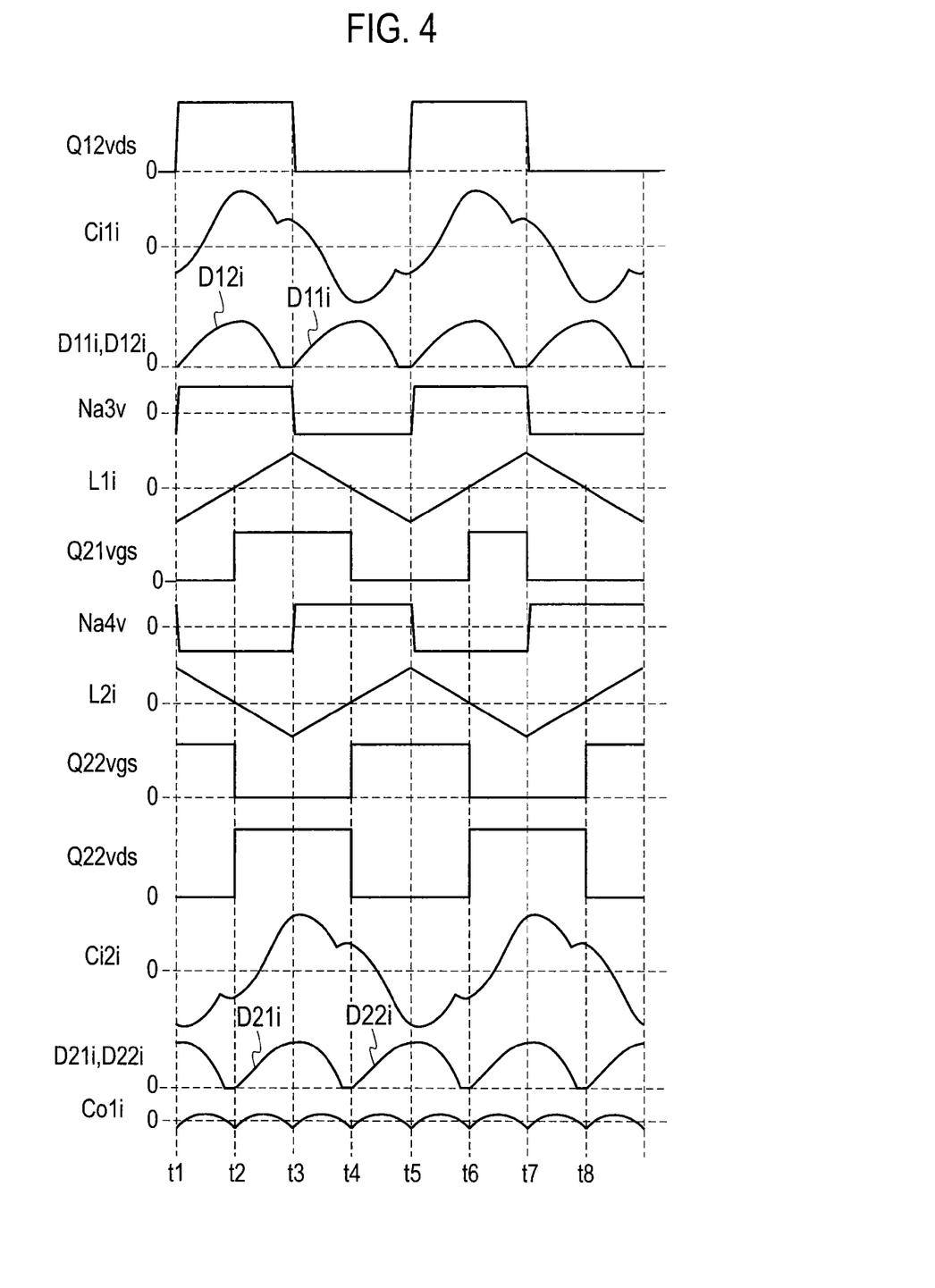
FIG. 4 is a waveform diagram illustrating operation of the switching power source apparatus of FIG. 3.

Operation of the switching power source apparatus according to Embodiment 1 will be explained with reference to the waveform diagram of FIG. 4.

The controller 10a applies a rectangular AC voltage having a duty cycle of 50% to the primary winding Np3 of the pulse transformer T3. In the first converter 3, the secondary windings Na1 and Na2 of the pulse transformer T3 alternately apply AC voltages to the gates of the switching elements Q11 and Q12.

The switching elements Q11 and Q12 alternately turn on/off at the same ON width, to pass sinusoidal resonant currents D11i and D12i on the secondary side of a transformer T1. This operation is similar to the operation of the related art illustrated in FIG. 1.

When the controller 10a applies the AC voltage to the primary winding Np3 of the pulse transformer T3, the secondary winding Na3 of the pulse transformer T3 in the second converter 4 also generates a rectangular AC voltage Na3v (corresponding to the "first pulse signal" stipulated in the claims) that is positive-negative symmetrical. The AC voltage Na3v is applied to the resonant series circuit 1 including the resonant reactor L1 and resonant capacitor C1. As a result, the resonant series circuit 1 passes a triangular AC current L1i through the bases and emitters of the transistors Q1 and Q2.

When receiving an AC voltage, such a resonant series circuit 1 including the resonant reactor L1 and resonant capacitor C1 passes a current that has a 90-degree phase delay with respect to the AC voltage. Namely, the triangular AC current L1i from the resonant series circuit 1 has a 90-degree phase delay with respect to the AC voltage Na3v applied to the resonant series circuit 1. Due to this, the current L1i passing through the resonant series circuit 1 causes a positive-negative change at a midpoint (for example, t2) of an ON period of the switching element Q11 (Q12).

When positive, the current L1i passes through the base and emitter of the transistor Q1, so that the transistor Q1 turns on in the positive period of the current L1i, to apply a voltage to the gate of the switching element Q21. When negative, the current L1i passes through the base and emitter of the transistor Q2, so that the transistor Q2 turns on in the negative period of the current L1i, to pull a bias current and decrease the gate voltage of the switching element Q21.

Similarly, when the controller 10a applies the AC voltage to the primary winding Np3 of the pulse transformer T3, the secondary winding Na4 of the pulse transformer T3 in the second converter 4 generates a rectangular AC voltage Na4v (corresponding to the "second pulse signal" stipulated in the claims) that is positive-negative symmetrical. The AC voltage Na4v is applied to the resonant series circuit 2 including the resonant reactor L2 and resonant capacitor C2. As a result, the resonant series circuit 2 passes a triangular AC current L2i through the bases and emitters of the transistors Q3 and Q4.

The secondary windings Na3 and Na4 of the pulse transformer T3 are wound in opposite polarity, and therefore, the generated voltages Na3v and Na4v have positive-negative symmetrical waveforms. Due to this, the current L1i passing through the resonant series circuit 1 and the current L2i passing through the resonant series circuit 2 have positive-negative symmetrical waveforms.

The gates of the switching elements Q21 and Q22 alternately receive voltages of the same ON width.

Namely, gate signals Q21vgs and Q22vgs are applied to the switching elements Q21 and Q22, respectively, so that the second converter 4 operates with a 90-degree phase difference and the same frequency with respect to the operation of the first converter 3.

If a resonant time constant of the second resonant circuit including the resonant reactor Lr2, the primary winding Np2 of the transformer T2, and the current resonant capacitor Ci2 is equal to a resonant time constant of the first resonant circuit including the resonant reactor Lr1, the primary winding Np1 of the transformer T1, and the current resonant capacitor Ci1, currents D21i and D22i from the second converter 4 involve a 90-degree phase difference with respect to the currents D11i and D12i from the first converter 3. Accordingly, a ripple current Co1i of the output smoothing capacitor Co1 is reduced to about ⅕ of that of the related art of FIG. 1 employing a single converter.

According to the switching power source apparatus of Embodiment 1, the gate drivers 20 and 30 turn on/off the switching elements Q21 and Q22 of the second converter 4 based on the current L1i of the resonant series circuit 1 including the resonant reactor L1 and resonant capacitor C1 and the current L2i of the resonant series circuit 2 including the resonant reactor L2 and resonant capacitor C2. Namely, only by adding the simple circuit, Embodiment 1 realizes a phase-shifted parallel operation to greatly reduce the ripple current Coli of the output smoothing capacitor Co1.

Embodiment 1 employs the pulse transformer T3 of low voltage instead of a high-voltage pulse transformer, applies a low-voltage pulse signal from the controller 10a to the primary winding Np3, and generates pulse signals from the secondary windings Na1, Na2, Na3, and Na4 to drive the switching elements Q11, Q12, Q21, and Q22.

Namely, Embodiment 1 applies a low-voltage pulse signal from the controller 10a to the low-voltage pulse transformer T3, thereby driving the switching elements Q11, Q12, Q21, and Q22 without using the input DC voltage from the DC power source Vin. Namely, Embodiment 1 is capable of driving the switching elements Q11, Q12, Q21, and Q22 without regard to the magnitude of the input DC voltage from the DC power source Vin. Since the pulse transformer T3 according to Embodiment 1 is of low voltage, it is compact and low cost.

The related art of FIG. 1 must employ a high-voltage level shifter in the controller 10, to drive the switching element Q11. The high-voltage level shifter is expensive and causes a loss when transmitting a drive signal at high frequency. Unlike the related art, Embodiment 1 controls the switching elements Q11, Q12, Q21, and Q22 with the single pulse transformer T3, thereby greatly reducing costs and eliminating the level shifting loss.

Embodiment 2

Figure 5:
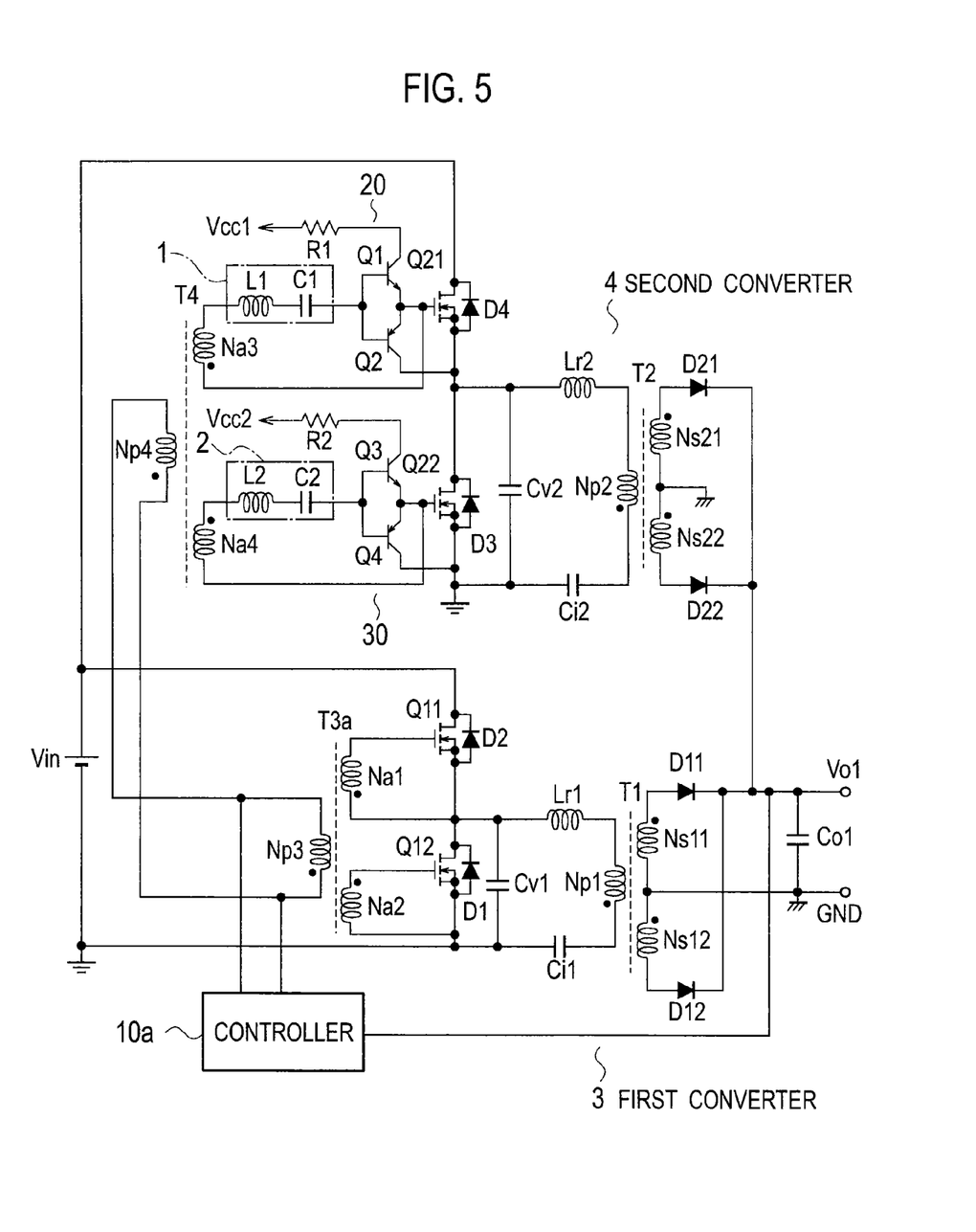
FIG. 5 is a circuit diagram illustrating a switching power source apparatus according to Embodiment 2 of the present invention.

FIG. 5 is a circuit diagram illustrating a switching power source apparatus according to Embodiment 2 of the present invention. Unlike Embodiment 1 of FIG. 3 that employs the single pulse transformer T3 having the primary winding Np3 and secondary windings Na1, Na2, Na3, and Na4, Embodiment 2 of FIG. 5 employs a pulse transformer T3a (corresponding to the "fourth transformer" stipulated in the claims) having a primary winding Np3 and secondary windings Na1 and Na2 and a pulse transformer T4 (corresponding to the "third transformer" stipulated in the claims) having a primary winding Np4 and secondary windings Na3 and Na4.

Both ends of the primary winding Np3 and both ends of the primary winding Np4 are connected to output terminals of a controller 10a. Connection relationships among the secondary windings Na1, Na2, Na3, and Na4 and switching elements Q11, Q12, Q21, and Q22 of Embodiment 2 are the same as those of Embodiment 1 illustrated in FIG. 3, and therefore, explanations thereof are omitted.

Embodiment 2 provides effects similar to those of Embodiment 1.

The present invention is not limited to the embodiments mentioned above. Although the embodiments have been explained in connection with current resonant switching power source apparatuses, the present invention is also applicable to, for example, push-pull switching power source apparatuses.

As mentioned above, the switching power source apparatus according to the present invention drives the third and fourth switching elements according to the first and second pulse signals provided by the first and second secondary windings of the third transformer without using an input DC voltage from the DC power source. Accordingly, the switching power source apparatus according to the present invention can drive the switching elements without regard to the magnitude of the input DC voltage and can employ a compact, low-cost, low-voltage transformer.

This application claims benefit of priority under 35USC §119 to Japanese Patent Application No. 2011-132906, filed on Jun. 15, 2011, the entire contents of which are incorporated by reference herein.

What is claimed is:

1. A switching power source apparatus comprising:
a first converter having a series circuit of a first switching element and a second switching element that is connected to both ends of a DC power source, a series circuit of a primary winding of a first transformer and a first capacitor that is connected to both ends of one of the first and second switching elements, and a first rectifier of a voltage generated by a secondary winding of the first transformer;
a second converter having a series circuit of a third switching element and a fourth switching element that is connected to the both ends of the DC power source, a series circuit of a primary winding of a second transformer and a second capacitor that is connected to both ends of one of the third and fourth switching elements, and a second rectifier of a voltage generated by a secondary winding of the second transformer;
a smoother of currents outputted from the first and second rectifiers;
a pulse generator that outputs a first pulse signal according to a switching state of the first switching element and a second pulse signal according to a switching state of the second switching element;
a first resonant series circuit of a first resonant reactor and a first resonant capacitor that receives the first pulse signal;
a first controller configured to turn on/off the third switching element according to a current of the first resonant series circuit;
a second resonant series circuit of a second resonant reactor and a second resonant capacitor that receives the second pulse signal; and
a second controller configured to turn on/off the fourth switching element according to a current of the second resonant series circuit, wherein:
the current of the first resonant series circuit to turn on/off the third switching element involves a 90-degree phase delay with respect to the first pulse signal and the current of the second resonant series circuit to turn on/off the fourth switching element involves a 90-degree phase delay with respect to the second pulse signal, so that the second converter operates with a 90-degree phase difference with respect to operation of the first converter; and
the pulse generator includes a third transformer having first and second secondary windings to output the first and second pulse signals, respectively, according to a voltage that is applied to the third transformer and is synchronized with drive signals for the first and second switching elements.

2. The switching power source apparatus of claim 1, wherein the third transformer further includes:
a third secondary winding configured to generate a gate signal for the first switching element; and
a fourth secondary winding that is wound in opposite polarity with respect to the third secondary winding and configured to generate a gate signal for the second switching element,
the first secondary winding being wound in the same polarity with respect to one of the third and fourth secondary windings,
the second secondary winding being wound in the same polarity with respect to the other of the third and fourth secondary windings.

3. The switching power source apparatus of claim 1, wherein the pulse generator further includes a fourth transformer that has:
a third secondary winding that generates a gate signal for the first switching element; and a fourth secondary winding that is wound in opposite polarity with respect to the third secondary winding and generates a gate signal for the second switching element, the first secondary winding being wound in the same polarity with respect to one of the third and fourth secondary windings, the second secondary winding being wound in the same polarity with respect to the other of the third and fourth secondary windings.

* * * * *

UNITED STATES PATENT AND TRADEMARK OFFICE
CERTIFICATE OF CORRECTION

| | | |
|---|---|---|
| PATENT NO. | : 8,724,345 B2 | Page 1 of 1 |
| APPLICATION NO. | : 13/494342 | |
| DATED | : May 13, 2014 | |
| INVENTOR(S) | : Yoichi Kyono | |

It is certified that error appears in the above-identified patent and that said Letters Patent is hereby corrected as shown below:

On the Title Page, Item (54), and in the Specification, Column 1, the title information is incorrect. It should read:

-- SWITCHING POWER SOURCE APPARATUS --

Signed and Sealed this
Twenty-sixth Day of August, 2014

Michelle K. Lee
*Deputy Director of the United States Patent and Trademark Office*